United States Patent Office 3,611,601
Patented Oct. 12, 1971

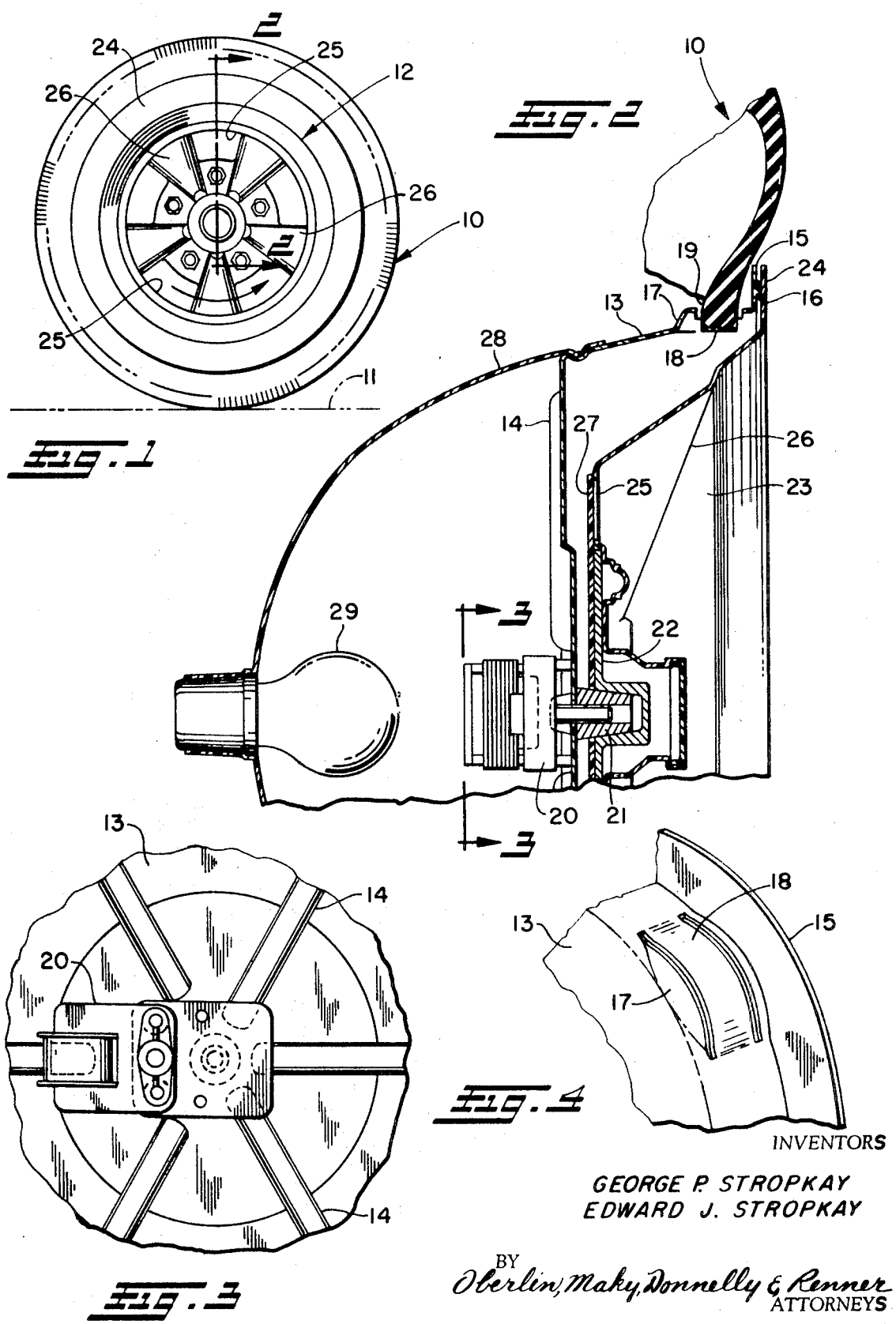

3,611,601
ROTATING WHEEL TIRE DISPLAY
George P. Stropkay, Mentor, and Edward J. Stropkay, Chesterland, Ohio, assignors to Product Design and Manufacturing Corp., Willoughby, Ohio
Filed Feb. 17, 1970, Ser. No. 12,064
Int. Cl. G09f 19/02
U.S. Cl. 40—106.51
7 Claims

ABSTRACT OF THE DISCLOSURE

A display assembly for mounting within a tire, the assembly including a simulated wheel part and an electric motor for rotating the same independently of the tire. A lamp can be added behind the wheel part and openings provided in the latter for interior illumination of the display.

---

The present invention relates to a display for automobile tires and the like in which there is a rotatable element such as a wheel part which rotates in association with the tire.

The idea of providing motion in such a display to make it more interesting and likely to attract attention is old as shown, for example, by U.S. Patent No. 1,886,549. This patent discloses a display stand on which the tire is mounted freely for rotation and driven by an electric motor having a frictional driving connection with the exterior tread portion of the tire. The full weight of the tire must be supported by the stand and the motor of course capable of making it revolve, with the result that the unit is of heavy construction and not particularly attractive.

According to the present invention, the tire itself is not rotated, and the wheel part or other rotatable element that does rotate can be an extremely light simulation which can very inexpensively be formed and operated.

Another principal object is to provide this new type of rotating wheel display which can be readily mounted within a tire to be exhibited, with the tire itself held vertically by any floor, counter, or wall stand or fixture suitable for the purpose.

It is also an object of the present invention to provide a rotating wheel display which is preferably illuminated to further enhance its attractiveness and hence its promotional value, for example, in exhibits and at tire sales outlets.

Other objects and advantages of the present invention will become apparent as the following description proceeds.

To the accomplishment of the foregoing and related ends the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In said annexed drawing:

FIG. 1 is a front elevation of a tire equipped with a rotating wheel display in accordance with the present invention;

FIG. 2 is a partially fragmented transverse section of the assembly as viewed from the plane of the line 2—2 in FIG. 1;

FIG. 3 is a fragmented rear view at the plane of the line 3—3 in FIG. 2; and

FIG. 4 is a fragmentary perspective view of another part of the assembly.

Referring now to the drawing in detail, reference numeral 10 designates generally a conventional automobile tire standing on the floor or another support surface represented by the line 11. As will become apparent, the tire does not actually required added support as far as the present invention is concerned, but it will more usually be stabilized by some form of available stand or fixture used for stationary tire display.

Reference numeral 12 designates generally a simulated wheel assembly which is mounted, and rotates, within the tire. This assembly comprises a housing 13 of general pan shape preferably formed of plastic for light weight, with bottom ribs 14 for stiffening, and transparent or transluscent for a purpose to be described. The housing has an outturned flange 15 from which a number of small spacers 16 protrude forwardly, and the cylindrical wall just behind the flange is shaped to define a plurality of circumferentially spaced raised mounts 17 for engaging the front bead of the tire in the manner shown in FIG. 2.

More particularly, each mount 17, with four preferably used, includes a depressible center strip 18 which is pushed inwardly by the tire bead when the housing is placed in the tire to provide a groove into which the bead 19 is snapped and held with spring action of the depressed strips thereagainst. The engagement of the pan housing in the tire forms the only mounting of the wheel assembly, and it can be accomplished by means other than the particular snap-attachment described.

A small electric motor 20 is secured to the bottom exterior of the housing at its center and has a tapered head 21 fixed to its drive shaft within the housing. A plate 22 with a center socket is forced on the head at the latter to be driven thereby and supports a simulated wheel part 23 which is also preferably made of light weight plastic and, in this case, metallized. The part 23 is dished and otherwise in the configuration of a normal wheel exterior, with its outer flange 24 overlying the housing flange 15 and spaced therefrom by the small protrusions 16 on the same.

It is also preferred that curved outer sections 25 of the simulated wheel between the radiating rib forms 26 be open, and that an annular piece of transparent colored plastic 27 be applied against the inner wheel surface to overlie these openings.

A generally hemispherical plastic reflector 28, preferably white in color, is attached to the rear of the housing 13 and supports a bulb 29 on the axis of the assembly for connection to an available electrical outlet. With the motor of course also connected, it will be apparent that the wheel part 23 rotates in the display, and the light from the bulb in passing through the bottom of the housing provides illumination through the colored plastic at the windows or openings 25. With the part 23 having a shiny metallic appearance, for example, chromelike, this back lighting with added color is especially striking.

Basically, then, the display includes a stationary support for the motor, a wheel part which is relatively within the tire opening but free to rotate, and a driving connection between the motor and wheel part.

The new assembly is thus of light and inexpensive construction and can be applied to any tire to form a display which is not only attractive but conveys an impression of action from the continuously rotating wheel part.

We, therefore, particularly point out and distinctly claim as our invention:

1. A rotating wheel tire display mounted within the wheel opening of a tire, said rotating wheel tire display comprising a support, means mounting said support against movement within said wheel opening, a rotatable element, means mounting said rotatable element on said stationary support for rotation substantially about the axis of said tire, said rotatable element substantially filling said wheel opening, and drive means for rotating said rotatable element to provide motion in the display of the tire.

2. A tire display as set forth in claim 1, wherein said rotatable element is formed to simulate the exterior face of an automobile wheel.

3. A display as set forth in claim 1, wherein said rotatable element has a light transmitting section, and a lamp is included behind said rotatable element to illuminate the display.

4. A display as set forth in claim 1, wherein said support is of general pan shape and attached to the front bead of the tire to extend interiorly therefrom, with said rotatable element at the outer open side of the support and obscuring the same.

5. A display as set forth in claim 4, wherein said rotatable element includes a light transmitting section, and lamp means behind said rotatable element provides interior illumination of the display.

6. A display as set forth in claim 1, wherein said means for mounting said support against movement on said tire comprises plural attaching means circumferentially spaced around the outer periphery of said support, said attaching means having portions which are snapped into engagement with the tire bead.

7. A dislay as set forth in claim 6, wherein said rotatable element is a piece of lightweight material formed to simulate the exterior face of an automobile wheel.

References Cited

UNITED STATES PATENTS

| | | | |
|---|---|---|---|
| 1,505,761 | 8/1924 | Adams | 40—129 B X |
| 1,553,053 | 9/1925 | Towle | 40—129 B X |
| 1,739,148 | 12/1929 | Lafferty et al. | 40—129 X |
| 1,896,030 | 1/1933 | Henkel | 40—129 B X |
| 2,082,612 | 6/1937 | Bourquin | 40—34 |
| 2,177,467 | 10/1939 | Sunderhauf | 40—133 129 |
| 2,798,324 | 7/1957 | Berger et al. | 40—34 |

ROBERT W. MICHELL, Primary Examiner

W. J. CONTRERAS, Assistant Examiner